(12) United States Patent
Filsinger et al.

(10) Patent No.: US 10,457,000 B2
(45) Date of Patent: Oct. 29, 2019

(54) FLOW AID FOR INFUSION STRUCTURE, INFUSION STRUCTURE COMPRISING A FLOW AID AND METHOD FOR INFILTRATING FIBRE MATERIAL WITH RESIN

(71) Applicant: AIRBUS DEFENCE AND SPACE GMBH, Ottobrunn (DE)

(72) Inventors: Juergen Filsinger, Hoehenkirchen-Siegertsbrunn (DE); Michael Steinhilber, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 477 days.

(21) Appl. No.: 14/786,618

(22) PCT Filed: Apr. 22, 2014

(86) PCT No.: PCT/DE2014/000209
§ 371 (c)(1),
(2) Date: Jan. 20, 2016

(87) PCT Pub. No.: WO2014/173389
PCT Pub. Date: Oct. 30, 2014

(65) Prior Publication Data
US 2016/0136905 A1 May 19, 2016

(30) Foreign Application Priority Data
Apr. 23, 2013 (DE) .................. 10 2013 006 940

(51) Int. Cl.
*B29C 70/54* (2006.01)
*B29C 70/44* (2006.01)
*B29C 70/48* (2006.01)

(52) U.S. Cl.
CPC ............ *B29C 70/548* (2013.01); *B29C 70/44* (2013.01); *B29C 70/48* (2013.01); *B29C 70/547* (2013.01)

(58) Field of Classification Search
CPC ................................ B29C 70/548; B29C 70/44
(Continued)

(56) References Cited

U.S. PATENT DOCUMENTS 4,560,523 A * 12/1985 Plumley ................ B29C 70/443
264/102
4,902,215 A 2/1990 Seemann, III
(Continued)

FOREIGN PATENT DOCUMENTS

DE 691 18 374 T2 10/1996
DE 100 13 409 C1 11/2000
(Continued)

OTHER PUBLICATIONS

IPRP with Written Opinion for Application No. PCT/DE2014/000209 dated Oct. 27, 2015.
(Continued)

*Primary Examiner* — Robert C Dye
*Assistant Examiner* — Russell E Sparks
(74) *Attorney, Agent, or Firm* — Jenkins, Wilson, Taylor & Hunt, P.A.

(57) ABSTRACT

A flow aid for an infusion structure for infiltrating fiber material with resin to produce a fiber composite component includes a resin-impermeable upper layer and a lower layer which are joined together in a peripheral region of the flow aid and provide a flow space between the two layers. The lower layer provides an outlet for discharging resin out of the flow aid into an interior of the infusion structure. The
(Continued)

flow aid includes an inlet for feeding the resin into the flow space, thereby facilitating uniform distribution of the resin over all of the fiber material.

11 Claims, 2 Drawing Sheets

(58) Field of Classification Search
USPC .......................................................... 264/511
See application file for complete search history.

(56) References Cited

U.S. PATENT DOCUMENTS

| | | | |
|---|---|---|---|
| 4,942,013 A | 7/1990 | Palmer et al. | |
| 5,316,462 A * | 5/1994 | Seemann | B29C 33/10 |
| | | | 264/316 |
| 5,939,013 A * | 8/1999 | Han | B29C 70/443 |
| | | | 264/257 |
| 6,406,659 B1 | 6/2002 | Lang et al. | |
| 6,627,142 B2 * | 9/2003 | Slaughter | B29C 43/003 |
| | | | 264/102 |
| 6,656,411 B1 | 12/2003 | McClure et al. | |
| 6,843,953 B2 | 1/2005 | Filsinger et al. | |
| 7,147,448 B2 | 12/2006 | Slaughter et al. | |
| 7,803,302 B2 * | 9/2010 | Hansen | B29C 70/546 |
| | | | 264/258 |
| 2005/0037678 A1 | 2/2005 | Mack et al. | |
| 2009/0184437 A1 * | 7/2009 | Hayashi | B29C 70/48 |
| | | | 264/101 |
| 2010/0108245 A1 | 5/2010 | Nishiyama et al. | |
| 2013/0280483 A1 | 10/2013 | Hayashi et al. | |

FOREIGN PATENT DOCUMENTS

| | | | | |
|---|---|---|---|---|
| DE | 602 16 108 T2 | | 6/2007 | |
| EP | 0 525 263 A1 | | 2/1993 | |
| EP | 2 305 441 B1 | | 4/2011 | |
| WO | 2007054097 A1 | | 5/2007 | |
| WO | WO-2012117869 A1 * | | 9/2012 | B29C 70/48 |

OTHER PUBLICATIONS

International Search Report from PCT/DE2014/000209 dated Aug. 6, 2014.

German Office Action for German Application No. 10 2013 006 940.8 dated Dec. 12, 2013.

German Office Action for German Application No. 10 2013 006 940.8 dated Oct. 16, 2014.

* cited by examiner

FLOW AID FOR INFUSION STRUCTURE, INFUSION STRUCTURE COMPRISING A FLOW AID AND METHOD FOR INFILTRATING FIBRE MATERIAL WITH RESIN

FIELD OF THE INVENTION

The present invention relates to a flow aid for an infusion structure, to an infusion structure comprising a flow aid of this type and to a method for infiltrating fibre material with resin to produce a fibre composite component.

BACKGROUND OF THE INVENTION

To produce fibre composite components, moulds are often used into which fibre material which is to be infiltrated with resin is introduced. The fibre material is then covered, for example with a gas-tight sheath which can be sealed off from the mould, and resin is infiltrated in at least one place of the "infusion structure" thus formed, in that a vacuum is produced in the gas-tight sealed interior of the structure in at least one other place of the structure. This method known as the vacuum infusion technique is used, for example in the "Seaman composites resin infusion moulding" (SCRIMP) process, in the "vacuum assisted resin transfer moulding" (VARTM) process, in the "vacuum assisted resin injection" (VARI) process or in the "vacuum assisted process" (VAP). A VAP process should be understood as a variant of a low-pressure infiltration technique for example.

To achieve a high-quality finished fibre composite component, it is important that during the resin infiltration procedure, the resin saturates the fibre material as uniformly as possible, i.e. for example an excessive flow resistance does not develop anywhere in the interior of the infusion structure. To introduce the resin as uniformly as possible into all of the fibre material, it is possible to interpose between the sheath and the fibre material pressure-resistant structures having flow channels, for example in the form of wide-mesh textile fabrics (for example woven fabrics, knitted fabrics, interlaced fabrics) or latticed mats. Structures of this type, which are introduced into the infusion structure together with the fibre material to be infiltrated, for conveying a fast and/or particularly uniform resin distribution in the fibre material are usually known as "flow aids". In other cases, flow channels which are open towards the fibre material, i.e. furrow-like grooves, are provided directly in the mould.

U.S. Pat. No. 6,656,411 B1 discloses a mould for producing fibre composite components which has a support surface for holding a first layer of fibre material, a pressure-tight intermediate piece having furrow-like channels on an upper surface and on a lower surface being arranged on the first layer of fibre material. A second layer of fibre material is arranged on the intermediate piece. A gas-tight sheath is provided on the second layer of fibre material. Resin can be conducted through the channels to the two layers on the surfaces on either side of the intermediate piece. The flow of resin is produced by a pressure difference generated by a vacuum pump.

A disadvantage of this prior art is that an excess of resin is generally unavoidable. A large amount of residual, unused resin material usually remains in the distributor media and/or on the fibre composite component to be produced.

U.S. Pat. No. 6,406,659 B1 discloses a mould for producing fibre composite components which has a support surface for holding fibre material which is to be infiltrated with resin, a first gas-tight film being arranged over the fibre material, and a pressure-tight intermediate piece having furrow-like channels being provided between said first film and a second gas-tight film. By applying a pressure difference, the first film can detach itself from the fibre material and instead can be placed in the channels of the intermediate piece. In this manner, distributor channels can be provided directly on the surface of the fibre material. The second film can facilitate the generation of the pressure difference.

A disadvantage of this prior art is that a large number of components is required and that adjusting the pressure difference requires a relatively large outlay in terms of apparatus and a relatively great control effort in terms of the process.

SUMMARY OF THE INVENTION

One idea of the present invention is to provide a device and a method by which fibre material can be infiltrated as uniformly as possible with resin to produce a fibre composite component, in particular without requiring a great amount of resin, and also as effectively and efficiently as possible.

In the flow aid according to the invention for an infusion structure for infiltrating fibre material with resin to produce a fibre composite component, this object is achieved in that the flow aid is configured comprising a resin-impermeable upper layer and a lower layer which are joined together in a peripheral region of the flow aid and provide a flow space between the two layers, the lower layer providing at least one outlet for discharging resin out of the flow aid into an interior of the infusion structure, and comprising an inlet for feeding the resin into the flow space.

A flow aid of this type can distribute the resin uniformly over all of the fibre material. The resin can spread out and distribute in the flow space, and can be provided substantially independently of (vacuum) pressure ratios in the interior of the infusion structure. A pressure-stable structure or a pressure-tight intermediate piece and a mould having special channels are not required. The infusion structure is also simplified thereby. The feed of the resin or the conveyance thereof inside the flow aid can advantageously be controlled in that a specific (excess) pressure for example is set inside the flow aid or at the inlet thereof. The distribution and conveyance of the resin inside the flow aid can thereby advantageously also be at least substantially disconnected from the vacuum prevailing in the outlet region of the flow aid in situations of use.

Alternatively, the resin can be provided with an excess pressure, which can accelerate the spread in the flow space and the discharge from the flow space. Consequently, the efficiency in the production of fibre composite components can be increased. Unlike vacuum infusion processes known hitherto, a pressure difference which drives the resin infusion is not restricted to the pressure difference between the interior and exterior of the infusion structure (at atmospheric pressure corresponding to approximately max. 1000 mbar for vacuum-assisted infusions without the use of a pressure chamber), but can be significantly higher. The flow aid can reduce the risk of fibre material being soaked, i.e. for example compressed or displaced by the flowing resin. The resin can advantageously spread substantially solely inside the flow space in a direction transverse to a main extension direction/plane of the fibre material. As soon as the resin leaves the flow aid, it can be conducted into the fibre material in suitable places thereof, substantially independently of any excess pressure (which has built up in a feed system/inlet or which prevails in the flow aid). The fibre material is thus not soaked. The resin does not have to be conducted through the fibre material over relatively great distances in a main extension direction of the fibre material. The arrangement of the fibre material or the orientation of the fibres is thus not impaired by the flow of resin.

The flow aid according to the invention which, in principle, can be freely dimensioned in shape and size, but which may have a flatly extended, plate-like or cushion-like shape provides the further advantage that a quantity of resin to be conveyed can be adjusted substantially independently of the characteristics of the other components of the infusion structure in question. The flow aid can also be removed after infiltration independently of the infusion structure. Furthermore, after a fibre composite component has been infiltrated, the infusion structure can be easily immediately reused for a further fibre composite component, for example in that a further (for example a new) flow aid is provided. The further fibre composite component can then also have a different shape or different dimensions and is arranged for example in only one part of the mould, and a suitable (in particular a geometrically adapted) flow aid can be provided for the further fibre composite component. The flow aid also makes it possible to change from one particular resin system to another in a simple manner, for example from polyester resins to epoxy resins or vice versa. In this respect, the infusion structure does not have to be cleaned in a laborious manner either, in particular residues of resin do not have to be removed from counter moulds, specifically from furrow-like resin channels in counter moulds.

Within the meaning of the invention, the term "resin" is intended to denote any matrix material which is capable of forming a fibre composite component by means of a fibre material. In this respect, the matrix material can for example already contain a curing agent (multi-component resin system). In a narrower sense, resin relates to thermosetting plastics materials, for example epoxy resin systems. However, thermoplastics should also not be excluded.

The term "resin-impermeable layer" includes any layer which cannot be penetrated by resin, not even at the maximum internal pressure in the flow aid which is to be expediently adjusted in the situation of use of the flow aid according to the invention.

The terms "upper" and "lower" used in the following do not necessarily relate to a vertical extent, but are to be understood in the sense of "side facing away from the mould" and "side facing the mould".

The term "upper layer" thus includes the layer of the flow aid which is directed away from the fibre material (semi-finished product) or from a fibre composite component to be produced. The term "lower layer" thus includes a layer which is arranged on the side of the fibre material, i.e. on the side of the semi-finished product, i.e. which, in an infusion structure, can come to rest on the fibre material to be infiltrated with resin or which can at least guide the resin in the direction of the fibre material.

The term "inlet" includes an access opening via which resin can be introduced into the flow space of the flow aid, it also being possible for the inlet to include a portion of an access line or a flange for joining the flow aid to an access line.

The term "interior of the infusion structure" includes a space in which at least the fibre material or the fibre composite component to be produced and the flow aid are arranged. This interior is typically surrounded by a mould surface and by a sheath sealed off from the mould surface.

The term "flow space" includes a space which is formed between the two layers of the flow aid, is surrounded thereby and in which the resin can spread and can be conveyed in order to be discharged from the flow space and brought into contact with the fibre material. The flow space can be formed for example as a cohesive flow space so that all regions of the flow space can be supplied with the resin via a single inlet. Alternatively however, a plurality of inlets can also be provided. For example, this is to supply resin quickly to a cohesive flow space. Furthermore, a plurality of inlets can for example be coupled to one of a plurality of sub-regions of the flow space in each case.

The two layers of the flow aid can be joined together in their peripheral region in many different ways. The layers are preferably welded, adhesively bonded or sewn in the peripheral region, it also being possible for a combination of these types of connection to be provided. The peripheral region thus preferably has a welded seam, a bonded seam and/or a sewn seam. The seam is preferably provided all round, it being possible for the seam to be interrupted in at least one place so that the inlet or an outlet opening can be provided through the interrupted point of the seam or can be provided so as to extend therethrough. As an alternative or in addition to an inlet or outlet of this type in the peripheral region, at least one inlet or outlet can also be provided in another region of the flow aid.

The fact that the two layers are joined together "in a peripheral region of the flow aid" does not necessarily mean that this peripheral region simultaneously constitutes a peripheral region of the two layers. Instead, at least one of the layers can also extend beyond the aforementioned "peripheral region of the flow aid" (cf. for example the examples described below in accordance with FIGS. 4a to 4c).

The two layers can be formed from a film material and/or a textile material. For example, the upper layer is formed from a film material and the lower layer is formed from a textile material. The layers are either gas-tight and liquid-tight, only liquid-tight, or (at least the lower layer) gas-permeable and liquid-permeable owing to a porosity of the material or to a perforation in the material. These characteristics of the material can be formed either individually or also in combination in each case in portions over a predeterminable surface region of the flow aid or of the individual layers. According to a variant, the upper layer is gas-tight and liquid-tight and the lower layer is not gas-tight. As a result, the upper layer can optionally also assume the function of a gas-tight sheath of the type usually used in the prior art in vacuum infusion methods ("vacuum film"). According to another variant, the flow aid assumes the function of a gas-tight sheath in the form of a "vacuum film".

Due to the configuration having two interconnected layers, between which a flow space can be formed, the flow aid is an expandable device which can adjust the flow of resin. In this respect, the flow aid can be expanded by the resin itself, in particular also in that an excess pressure is generated in the resin medium or in that the resin is provided with an excess pressure.

The term "outlet" includes a single opening or a plurality of openings through which the resin can leave, in particular at an excess pressure (based on atmospheric pressure and/or based on the pressure "on the far side" of the outlet, i.e. the space in which the fibre material to be infiltrated is located) in order to be introduced into the fibre material. The outlet preferably comprises a plurality of openings which are arranged in the lower layer such that the resin can be introduced locally into the fibre material in as many suitable places as possible, without having to flow relatively long distances through the fibre material.

According to one embodiment, the two layers are joined together in at least one place inside a centre region surrounded by the peripheral region. Consequently, the flow aid can be provided with a stable structure, particularly also in respect of an increased internal pressure in the flow space. Furthermore, the two layers can be oriented by the connection point(s) in a desired arrangement and/or at a particular distance from one another.

The connection point in the flow space can be freely selected (in each case) over the extent or surface of the layers. The connection point can be provided (in each case) in a punctiform, linear and/or flat form. The connection point can keep the two layers at a defined distance from one another, even at an excess pressure which acts from inside on the two layers in the flow space. The distance can also vary over the extent of the flow aid, in particular to preset a flow resistance which is different in specific portions of the flow aid in each case. A plurality of connection points can also be provided, and the two layers can be kept at a uniform distance from one another which is maintained at least along predetermined flow paths of the flow space.

The flow aid may have at least one connection means in the flow space which joins the two layers together, in particular at a defined distance from one another. The connection means can be, for example, a connecting seam which is fixed at a connection point of the upper layer and at a corresponding connection point of the lower layer. The connection means can also be configured, for example, as a dividing wall, consisting in particular of a material like that of the first or second layer. The dividing wall can be adhesively bonded, welded or sewn for example to the two layers. The connection means can be arranged such that the resin flows through the flow space in a particular manner (along predetermined flow paths). The connection means can be configured, for example, such that the two layers are arranged at a greater distance from one another in the region of a main channel than in the region of subsidiary channels which branch off from said main channel, and therefore a flow resistance can also be adjusted subject to the quantity of resin to be conveyed in the respective channels.

According to a further embodiment, the two layers are joined together in a punctiform and/or linear and/or planar manner in a plurality of places in the centre region such that at least one flow path is provided between the two layers for the directed conveyance of the resin inside the flow space. As a result, the resin can be conveyed in a predefinable manner into individual sub-regions of the flow space and thereby, for example to individual openings in the outlet. The connection points can be arranged such that they each form lateral boundaries of channels for a directed spread of the resin inside the flow space, for example also in that a plurality of punctiform connection points are arranged closely behind one another (for example along a rectilinear or non-rectilinear connection line). Consequently, a main flow direction can be predetermined, and it is still possible for resin to flow from one channel having a resin excess into an adjacent channel having a resin deficiency or having a relatively smaller quantity of resin.

The flow path or paths formed by the connection points can extend, for example in a grid-like manner (for example in the form of a chess board) in the flow space. A respective flow path can be formed for example as a longitudinal channel, a transverse channel or even as a diagonally extending channel. The layers may be joined together such that at least one "main channel" (longitudinal channel) is formed, from which a plurality of transverse channels extend, in particular branch off perpendicularly from the main channel. In this way, in a flow device having a simple design, the resin can be provided homogeneously over the entire (lateral) extent of the flow aid. As previously stated, it is also possible to specifically provide connection means at the connection points which join the two layers together.

Structuring the flow space into a plurality of flow paths provides the further advantage that the entire quantity of resin can be conveyed hierarchically, for example first of all in a wide (main) channel having a relatively low flow resistance and then in narrower (subsidiary) channels which extend from the wider channel. In other words, the orientation and also the cross section of individual resin-conducting (sub) regions can be adjusted by the connection points. A plurality of flow paths which are interconnected or can be charged with resin substantially independently of one another can be formed by the connection points.

According to a variant, the upper layer is gathered between some or all of the connection points, whereas the lower layer is preferably not gathered. The gathering of the upper layer (for example a plastics film) is preferably present before the two layers are joined together at the connection points. Due to the gathering, when the flow aid is pressurised, relatively voluminous channels can form even if the layers lie close to one another or rest against one another at the connection points. The gathering provides a larger upper layer in terms of surface area compared to the lower layer. The gathering of substantially only the upper layer affords the advantage that even when the flow aid is pressurised, the lower layer can be arranged at least substantially in one plane (or following the surface contour of the fibre material to be infiltrated with the resin) and can come to rest in a flat manner on the fibre material. This is also the case, for example, when connection points which keep the layers at a predetermined distance from one another are not provided between the layers.

Alternatively, the upper layer can be resiliently extensible and the lower layer can be substantially non-extensible so that, during pressurisation, the channels form between the connection points due to a (relatively large) expansion of the upper layer. Nevertheless, the lower layer can also be resiliently extensible, but in this case preferably less so than the upper layer. When the flow aid is pressurised, the upper layer then expands and becomes greater in terms of surface area than the lower layer. The upper layer provides a volume expansion of the flow aid. The upper layer alone may provide the volume expansion. The arrangement of the lower layer relative to the fibre material then does not change during the increase in volume or expansion. When the upper layer is larger in terms of surface area, the lower layer can come to rest flat on the fibre composite component to be produced or on the fibre material, and the fibre material can be uniformly infiltrated independently of the (cross-sectional) shape of the channels.

According to another embodiment, a distributor medium (for ensuring a smooth flow of resin) is arranged between the two layers, i.e. in the flow space. The distributor medium can be formed, for example, from a "conventional flow aid" (as described, for example, at the outset with reference to the prior art). As a result, the resin can be distributed even more uniformly and/or in an even more direction-specific manner into specific portions/regions of the flow aid according to the invention: for this purpose, the distributor medium is arranged in the channels of the flow aid so that said channels are open in particular when a vacuum connection is activated. The resin can be conveyed relatively easily in specific directions or in predefinable proportions into respective regions of the flow space. In this respect, the distributor medium can either be provided only in one region of the flow space or in the entire flow space. Different distributor media can also be combined, particularly those which differ in terms of the flow resistance. Distributor media having a relatively low flow resistance are preferably arranged in regions of the flow space which the resin could otherwise only reach after overcoming a relatively greater flow resistance, for example in the regions of the flow aid which are furthest away from the relevant inlet. As a result, the uniform distribution or spread of the resin can be further improved.

The distributor medium can be formed, for example, as a wide-mesh textile fabric (for example a woven fabric, a knitted fabric or an interlaced fabric) having a three-dimensional extent, for example a nonwoven, or as a woven distributor fabric having, for example, a relatively wide-mesh structure and the lowest possible flow resistance, or as a latticed mat having a three-dimensional extent. For example, open-knit fabrics can be used, in particular having loops in which individual feet of the loop do not cross. In one embodiment, the distributor medium is formed by a dimensionally stable body which is arranged between connection points at which the two layers are joined together inside the flow space, i.e. in the centre region surrounded by the peripheral region. According to a variant, the connection points form transverse channels and longitudinal channels, and the distributor medium (for example formed as a dimensionally stable body) is arranged in the transverse channels and/or in the longitudinal channels.

The dimensionally stable body may be pressure-tight, i.e. substantially stable with respect to the pressure differences to be expected in the situations of use, so that, when a pressure which is exerted on the upper layer or on a separate sheath is adjusted, the resin can flow unimpeded through the flow aid, even if a pressure in the resin medium should be lower than the first mentioned pressure. A differential pressure can be applied in particular by a pressure difference between the gaseous medium in the interior above the upper layer and the gaseous medium in the region of the fibre material below the lower layer, as can also be carried out in a low-pressure infiltration method.

According to another embodiment, the outlet is provided by a perforation in the lower layer and/or by a resin permeability of the lower layer. A perforation can be easily provided in the lower layer, thereby making it possible to provide a simply constructed flow aid. The perforation is to be understood as a plurality of openings or holes through which the resin can leave the flow aid and can be introduced into the fibre material. The openings can be made by perforating the lower layer. The flow aid can be easily configured with regard to specific resin characteristics, for example viscosity, by the number, density, size and distribution of the openings over the lower layer, in particular to adjust pressure ratios and a specific resin volume flow. For example, the spacing between the openings or holes can vary between 1 mm and 10 cm, with a diameter of between 10 µm and 5 mm. The spacing and/or diameter of the openings or holes is advantageously selected such that the permeability of the flow of resin is adapted to the thickness of the fibre material. In particular, the openings or holes can have a different diameter, spacing and/or distribution in at least one sub-region of the lower layer.

The resin permeability can be formed, for example, by a flat porous material portion of the lower layer. The lower layer may be only porous in one or more portions in which resin is intended to be discharged onto the fibre composite component. The porosity of the lower layer can be a characteristic of the lower layer which is at least substantially independent of a temperature and pressure. Alternatively, the porosity of the lower layer can be adjustable subject to temperature and/or pressure, particularly in that the porosity is only adjusted after a specific temperature and/or a specific pressure has been adjusted, or in that the porosity changes when the temperature and/or pressure is changed.

According to a further embodiment, the lower layer of the flow aid is formed in two plies: the first ply, facing the fibre material, of the lower layer is formed from a film which has a high melting point and/or a high strength. For example, for infiltration with a resin to be cured at 80° C., a film having a melting point of 100° C. or above can be selected for the first ply. The first ply may be resistant during infiltration and/or curing, i.e. the first ply does not melt or rupture. The first ply of the lower layer has the described porosity. The second ply of the lower layer is formed from a film having a lower melting temperature (for example 50° C.) and/or a lower strength than that of the first ply. The second ply covers or closes the openings or holes in the first ply facing the fibre material. The openings or holes may open at a temperature at which the resin slowly reacts, thereby allowing a complete impregnation of the fibre material. Only after the second ply has melted does the resin flow through the openings or holes in the first ply of the lower layer into the fibre material. In this embodiment, the upper layer can be formed from the same film as the first ply of the lower layer.

The porosity of the lower layer can also vary in portions, for example it can be greater in regions of the flow space having a higher flow resistance than in regions having a lower flow resistance so that the resin can be discharged uniformly onto the fibre material. On the other hand, it can be advantageous to introduce the resin in an intentionally non-uniform manner into the fibre material, for example to be able to consider the locally varying component thickness.

According to another embodiment, the peripheral region of the flow aid has (at least) one outlet opening. The flow of resin can be influenced (substantially) independently of the construction of the flow aid due to an exit opening which is separate from the outlet. The exit opening can be used, for example, to apply a vacuum, in particular by means of a vacuum pump. The exit opening can be arranged opposite the inlet for example, in particular at a point relatively far removed from the inlet to also promote the conveyance of the resin into those regions of the flow space which can only be reached by overcoming a relatively large flow resistance. The flow of resin can thereby be adjusted via an excess pressure and can be directed by the exit opening. A vacuum can also be applied at the exit opening, for example, only when the flow aid is being filled. The exit opening can then be closed or blocked as soon as the flow aid is completely full with resin and the resin is intended to be introduced into the fibre material through the outlet. This measure can prevent regions of the fibre material which are arranged close to the inlet from being saturated with more resin than other regions. Saturation with resin then takes place simultaneously through the entire outlet, in particular through all the holes of a perforation, when the flow aid is completely full and when the pressure in the resin or in the flow aid exceeds a specific value.

However, the exit opening can also be configured without a pump as a type of pressure regulating valve, from which resin can leave without coming into contact with the fibre material. This measure can rule out the danger of the flow aid bursting.

The flow aid may be arranged in an infusion structure for infiltrating fibre material with resin to produce a fibre composite component, in particular it can be arranged directly on the fibre material. Alternatively, the flow aid can cover the fibre material either fully or only in regions, depending on the task to be performed. The size and shape of the flow aid can be freely selected and optionally specifically adapted to the size and/or shape of the fibre composite component to be produced. In this respect, the flow aid itself can also provide a gas-tight sheath in the form of a "vacuum film" by means of the upper layer, thereby providing a simple construction for the use of low-pressure infiltration techniques. In this respect, the upper layer can serve to seal off the fibre material in the interior from the surroundings or the atmosphere in a gas-tight manner so that a vacuum or at least a pressure difference can be produced on the side of the fibre material. The use of a vacuum film separate from the flow aid is thereby not necessarily required. Furthermore, a variant of the flow aid can be used so that the flow aid per se provides a gas-tight sheath in the form of a "vacuum film".

According to a further embodiment, the infusion structure has a base having a support surface for the fibre material and an airtight sheath, which can be sealed off from the support surface, for covering the fibre material to cause an infiltration of the fibre material by means of a vacuum, the flow aid being arranged in an interior of the infusion structure. This measure can promote the flow of resin into the fibre material. The flow aid can also be pressed onto the fibre material in a simple manner. The sheath can be formed, for example, as a separate vacuum film (alternatively, it is possible for example to consider using a peripheral region, which extends beyond the peripheral region of the flow aid, of one of the two layers, as the sheath).

To generate pressure, the infusion structure may have for example conveying means for providing a resin with excess pressure or with a high volume flow or is coupled to conveying means provided separately from the infusion structure in order to introduce resin into the flow aid via the (at least one) inlet.

According to another embodiment, the infusion structure has a microporous membrane which forms part of the outlet of the flow aid. As a result, the effect of a vacuum can be distributed uniformly over the entire fibre material. Furthermore, the resin can be discharged from the flow aid more simply or at several places. The conveyance inside the flow space can also be facilitated in that the porous membrane forms a spatially expanded interface by means of which a drop in pressure can be produced. This measure can prevent the resin from flowing (in a punctiform or linear manner) to predetermined points. Instead, the resin flows more homogeneously (in a planar manner) to the porous membrane portions.

The infusion structure can be evacuated at the interface formed by the membrane. The microporous membrane may be arranged in the peripheral region and/or above a surface portion of the lower layer. The membrane can also be arranged between a plurality of flow aids. It is possible to use "vacuum assisted process" (VAP) membranes as microporous membranes for example, i.e. semi-permeable membranes which are permeable to gas but which hold back the resin. This measure effectively prevents gas cavities in the fibre material ("dry spots").

In a method according to the invention for infiltrating fibre material with resin to produce a fibre composite component by means of a flow aid according to the invention, the resin is introduced into the flow space, the resin is distributed in the flow space and the resin is discharged out of the flow space, the resin being introduced with excess pressure. Consequently, the resin can be conveyed through the flow space under a higher absolute pressure difference and, as a result, with a higher volume flow than would be possible by merely generating a vacuum in the interior of the structure. This increases the efficiency of the method because residues of resin in the flow aid which can occur in known flow aids are reduced or are negligible. On the one hand, a flow of resin can be provided with a high flow rate and on the other the spread of the resin inside the fibre material can be promoted.

According to a further embodiment, the infiltration method is carried out using an infusion structure of the described type, it being possible to promote the discharge of the resin by producing a vacuum. Consequently, the resin can spread inside the fibre material in a particularly uniform manner, and the advantages of an excess pressure in the resin medium inside the flow aid can be combined with the advantages of the low-pressure infiltration technique.

BRIEF DESCRIPTION OF THE DRAWINGS

In the following, the invention is described in more detail on the basis of embodiments with reference to the accompanying drawings, in which.

DETAILED DESCRIPTION OF EMBODIMENTS OF THE INVENTION

Figure 1:
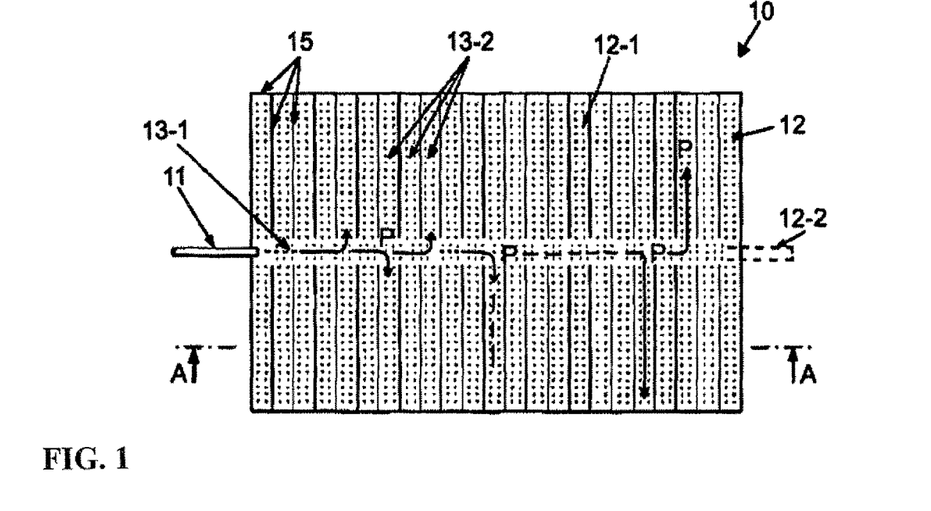
FIG. 1 is a schematic plan view of a flow aid according to one embodiment of the invention.

FIG. 1 shows a flow aid 10 comprising an inlet 11 for introducing resin, which inlet opens into a longitudinal channel 13-1 which leads to transverse channels 13-2 branching off therefrom. The transverse channels 13-2 are formed by connecting seams 15. An outlet 12 for discharging resin is formed by perforations 12-1 which are uniformly distributed over the entire flow aid 10. The flow aid 10 can optionally have one exit opening 12-2 (indicated by dashed lines) at which a differential pressure can be generated.

Resin flows from the inlet 11 through the longitudinal channel 13-1 and the transverse channels 13-2 along flow paths P to the perforations 12-1 and can flow out of the flow aid 10 via the perforations 12-1. The perforations 12-1 thus form an interface to a fibre material to be infiltrated or to a fibre composite component to be produced (not shown).

Figure 2:
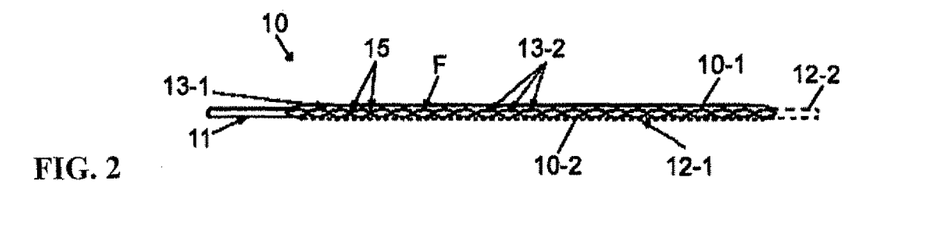
FIG. 2 is a schematic sectional view of the flow aid shown in FIG. 1 when it is filled with resin.

FIG. 2 is a schematic sectional view along the line A-A in FIG. 1 and shows an upper layer 10-1 and a lower layer 10-2 of the flow aid 10, which layers define a flow space F. Provided between the layers 10-1, 10-2 are the connecting seams 15 which form the abovementioned longitudinal and transverse channels 13-1, 13-2 and can arrange or keep the layers 10-1, 10-2 at a predetermined distance from one another. The connecting seams 15 pass through the flow aid 10 and can be fixed directly to the layers 10-1, 10-2 or alternatively can also be fixed to additional connection means (not shown), in particular dividing walls, which extend, for example perpendicularly to the layers 10-1, 10-2.

In the following description of further embodiments, the same reference numerals will be used for components having an identical function. In this respect, essentially only the differences compared to the embodiment which has already been described will be discussed and reference is hereby explicitly also made to the description of the previous embodiments.

Figure 3A:
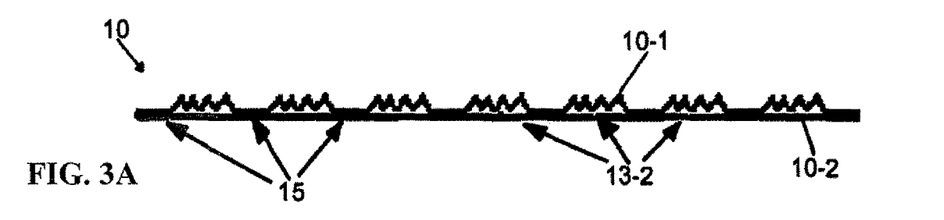
FIG. 3A is a schematic side view of a flow aid according to one embodiment of the invention in an uncharged state.

FIG. 3a shows a flow aid 10 according to a further embodiment, in which an upper layer 10-1 is joined at connection points 15 to a lower layer 10-2, the upper layer 10-1 having a gathering of material between the connection points 15. The upper layer 10-1 has respectively more material between the respective connection points 15 than the lower layer 10-2. During the charging with resin, a relatively voluminous channel can be provided in each case between the connection points 15 as a result of the gathering of material. In the illustrated example, this is the case for the transverse channels 13-2.

Figure 3B:
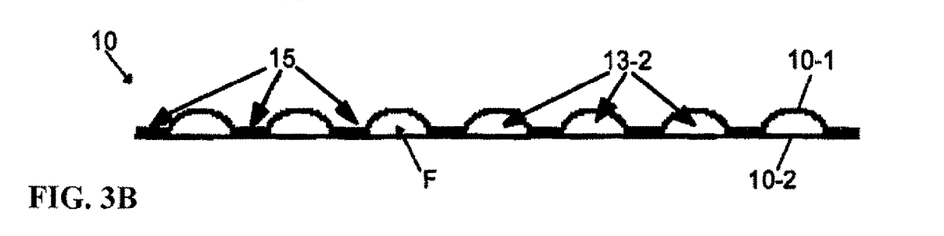
FIG. 3B is a schematic side view of the flow aid shown in FIG. 3a when it is filled with resin.

FIG. 3b shows the flow aid in a state charged with resin. It can be seen that the gathering of material of the upper layer 10-1 of the flow aid 10 delimits a relatively large flow space F as soon as resin is introduced into the flow aid 10 and flows through the channels 13-2. The resin ensures that the gathering of material is tautened and that the channels 13-2 each assume a particular shape and give the resin-conducting regions a particular cross section, here a semi-circular cross section. In this respect, the lower layer 10-2 is still arranged in one plane and can therefore be brought into planar contact with the fibre material (not shown) which is to be infiltrated by means of the flow aid 10.

Figure 4A:
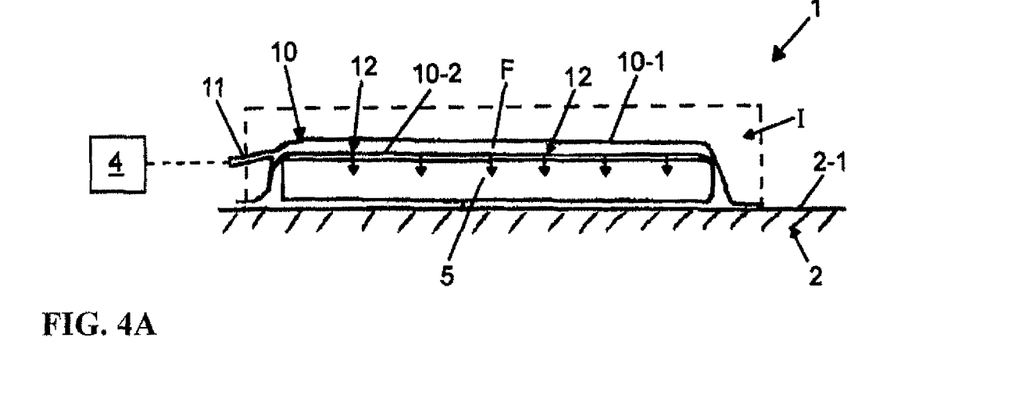
FIG. 4A is a schematic side view of an infusion structure comprising a flow aid according to one embodiment of the invention, the flow aid being coupled to a conveying means.

FIG. 4a shows a further embodiment. This figure shows an infusion structure 1 having a base 2 (moulding surface of a mould) which has a support surface 2-1 for holding fibre material 5. A flow aid 10 is arranged on the fibre material 5. The fibre material 5 and the flow aid 10 are both arranged in an interior I of the infusion structure 1. The interior I can be, for example, the interior of an oven or of a pressure chamber (autoclave) in which the infusion process and optionally also a subsequent curing process are carried out. A conveying means 4 is coupled to an inlet 11 of the flow aid and is configured to feed resin to the flow aid 10 at an adjustable pressure, in particular under excess pressure. The resin can flow out of the flow aid 10 through a lower layer 10-2 of the flow aid 10, in which lower layer an outlet 12 is formed (for example by a porosity of the lower layer 10-2 and/or by perforations subsequently formed therein) and the resin can flow into the fibre material 5 according to the indicated arrows.

Figure 4B:
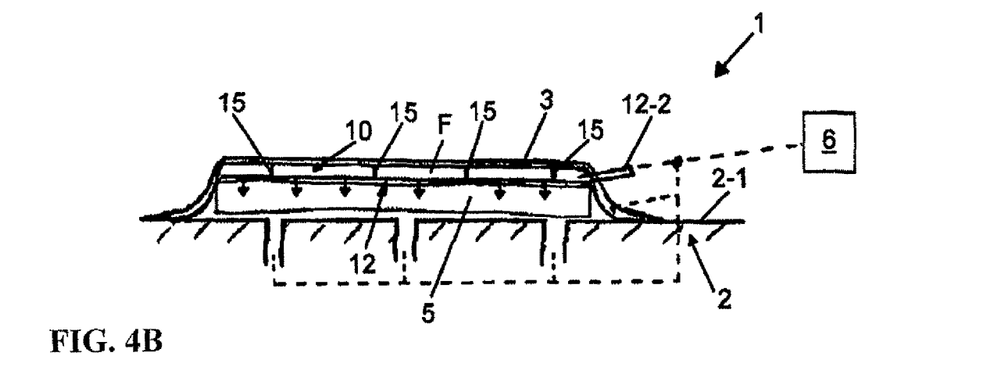
FIG. 4B is a schematic side view of an infusion structure comprising a flow aid according to one embodiment of the invention, a separate gas-tight sheath being provided over the flow aid and the flow aid being coupled to a vacuum pump.

FIG. 4b shows a further embodiment. This figure shows a vacuum pump 6 which is coupled to an outlet opening 12-2 in the flow aid 10 and to discharges in the base 2. Furthermore, the vacuum pump 6 is coupled to a space under a gas-tight sheath or vacuum film 3 which covers the flow aid 10. The flow aid 10 has connection means 15 which arrange an upper layer and a lower layer of the flow aid 10 at a defined distance from one another. The lower layer 10-2 of the flow aid 10 has a two-ply construction, the first ply thereof having the outlet (for example due to a porosity of the lower layer 10-2 and/or due to perforations subsequently formed therein) and the second ply initially closing the outlet. When the second ply is melted, the outlet is opened and the resin flows into the fibre material 5.

Figure 4C:
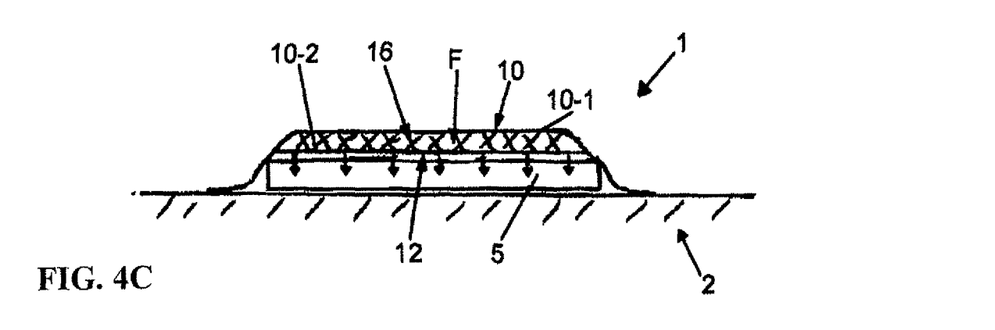
FIG. 4C is a schematic side view of an infusion structure comprising a flow aid according to one embodiment of the invention, the flow aid having a distributor medium arranged between an upper layer and a lower layer.

FIG. 4c shows a further embodiment. This figure shows a flow aid 10 in which a distributor medium 16 (for example a nonwoven or for example a dimensionally stable structure) is arranged between an upper layer 10-1 and a lower layer 10-2. The distributor medium 16 extends inside the flow space F formed between the layers 10-1, 10-2 and can keep the two layers 10-1, 10-2 at a defined distance from one another, for example if a gas-tight sheath (not shown) rests against the upper layer 10-1 of the flow aid 10 during the infiltration process and exerts a gas pressure on the flow aid 10. Resin can flow through the distributor medium 16 which can predetermine individual flow paths for the resin, in particular with a specific flow resistance.

What is claimed is:

1. A flow aid for an infusion structure for infiltrating fibre material with resin to produce a fibre composite component, comprising:
    a resin-impermeable upper layer comprising an areal expanse;
    a lower layer comprising an areal expanse, the resin-impermeable upper layer and the lower layer being joined together in a peripheral region of the flow aid and providing a flow space between the two layers, and the lower layer comprises at least one outlet for discharging resin out of the flow aid into an interior of the infusion structure; and
    an inlet for feeding the resin into the flow space, wherein the inlet opens into a central longitudinal channel which leads to transverse channels branching off therefrom,
    wherein the transverse channels are formed by at least one connection point between the resin-impermeable upper layer and the lower layer, and
    wherein the at least one connection point is provided such that the resin-impermeable upper layer and the lower layer are kept apart from one another at a defined distance which varies over an extent of the flow aid.

2. The flow aid according to claim 1, wherein the at least one connection point is disposed inside a centre region surrounded by the peripheral region.

3. The flow aid according to claim 2, wherein the at least one connection point is provided as a dividing wall, which is fixed at a connection point of the resin-impermeable upper layer and at a corresponding connection point of the lower layer.

4. The flow aid according to claim 1, comprising a plurality of connection points provided in a punctiform and/or planar manner in a centre region such that at least one flow path is provided between the resin-impermeable upper layer and the lower layer for the directed conveyance of the resin inside the flow space.

5. The flow aid according to claim 1, wherein a distributor medium is arranged between the resin-impermeable upper layer and the lower layer.

6. The flow aid according to claim 1, wherein the at least one outlet comprises a perforation in the lower layer and/or by a resin permeability of the lower layer.

7. The flow aid according to claim 1, wherein a resin permeability of the lower layer is selected to provide the at least one outlet in the lower layer for resin, wherein the permeability is formed by a porosity in one or more regions of the lower layer.

8. The flow aid according to claim 1, wherein the peripheral region has at least one outlet opening.

9. The flow aid according to claim 1, comprising a plurality of connection points provided in a linear manner in a centre region such that at least one transverse flow path is provided between the resin-impermeable upper layer and the lower layer for the directed conveyance of the resin inside the flow space.

10. The flow aid according to claim 1, wherein the flow aid comprises a flatly extended, planar shape.

11. The flow aid according to claim 1, wherein the flow aid is configured to be removed after infiltration of the infusion structure and/or the flow aid is configured to be reusable.

* * * * *